United States Patent
Smith et al.

(10) Patent No.: US 11,589,494 B2
(45) Date of Patent: Feb. 28, 2023

(54) SYSTEM AND METHOD FOR MANAGING MATERIAL ACCUMULATION RELATIVE TO GROUND ENGAGING TOOLS OF AN AGRICULTURAL IMPLEMENT

(71) Applicant: CNH Industrial Canada, Ltd., Saskatoon (CA)

(72) Inventors: Kevin M. Smith, Narvon, PA (US); James W. Henry, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 651 days.

(21) Appl. No.: 16/675,392

(22) Filed: Nov. 6, 2019

(65) Prior Publication Data

US 2021/0127540 A1 May 6, 2021

(51) Int. Cl.
*A01B 67/00* (2006.01)
*A01B 19/10* (2006.01)
*A01B 79/00* (2006.01)
*A01B 61/00* (2006.01)
*A01B 63/111* (2006.01)

(52) U.S. Cl.
CPC .............. *A01B 67/00* (2013.01); *A01B 19/10* (2013.01); *A01B 61/00* (2013.01); *A01B 63/1112* (2013.01); *A01B 79/005* (2013.01)

(58) Field of Classification Search
CPC ..... A01B 63/1112; A01B 67/00; A01B 19/10; A01B 79/005; A01B 61/00
See application file for complete search history.

(56) References Cited

U.S. PATENT DOCUMENTS

| | | | | |
|---|---|---|---|---|
| 4,924,374 A * | 5/1990 | Middleton et al. | ..... | E02F 3/847 172/430 |
| 5,327,345 A * | 7/1994 | Nielsen et al. | ....... | E01C 19/006 701/50 |
| 5,462,389 A * | 10/1995 | Messina | ................... | E02F 5/104 405/164 |
| 6,152,238 A * | 11/2000 | Ferrell et al. | ........... | E02F 3/847 701/50 |
| 6,778,097 B1 * | 8/2004 | Kajita et al. | ............ | E02F 3/437 342/426 |
| 6,778,894 B2 * | 8/2004 | Beck et al. | .......... | A01D 41/127 701/50 |

(Continued)

FOREIGN PATENT DOCUMENTS

WO WO2011138488 11/2011

*Primary Examiner* — Thomas B Will
*Assistant Examiner* — Joel F. Mitchell
(74) *Attorney, Agent, or Firm* — Rebecca Henkel; Rickard DeMille

(57) ABSTRACT

A system for managing material accumulation relative to ground engaging tools of an agricultural implement may include a ground engaging tool and an acoustic sensor configured to generate data indicative of an acoustic parameter of a sound produced as the ground engaging tool engages the ground when a ground engaging operation is performed within a field. Additionally, the system may include a controller communicatively coupled to the acoustic sensor. The controller may be configured to monitor the data received from the acoustic sensor and determine a presence of material accumulation relative to the ground engaging tool based at least in part on the acoustic parameter.

20 Claims, 5 Drawing Sheets

(56) References Cited

U.S. PATENT DOCUMENTS

| | | | |
|---|---|---|---|
| 6,853,937 B2 * | 2/2005 | Shibusawa et al. | A01B 79/005 |
| | | | 702/100 |
| 7,133,757 B2 * | 11/2006 | Miedema | A01B 79/005 |
| | | | 701/50 |
| 7,302,837 B2 | 12/2007 | Wendte | |
| 8,448,587 B2 | 5/2013 | Kowalchuk | |
| 8,478,492 B2 | 7/2013 | Taylor et al. | |
| 8,600,627 B2 | 12/2013 | Beck et al. | |
| 8,695,396 B2 | 4/2014 | Landphair et al. | |
| 8,950,260 B2 | 2/2015 | Gelinske et al. | |
| 9,485,900 B2 | 11/2016 | Connell et al. | |
| 9,631,964 B2 * | 4/2017 | Gelinske et al. | G01F 1/662 |
| 10,006,994 B2 | 6/2018 | Chan et al. | |
| 10,143,125 B2 * | 12/2018 | Schleyer et al. | A01B 63/145 |
| 10,188,024 B2 | 1/2019 | Rusciolelli et al. | |
| 10,440,876 B2 * | 10/2019 | Sporrer et al. | A01B 63/14 |
| 11,215,601 B2 * | 1/2022 | Pomedli | A01C 21/007 |
| 2015/0293507 A1 | 10/2015 | Burns et al. | |
| 2018/0153091 A1 | 6/2018 | Hamilton | |
| 2018/0352718 A1 * | 12/2018 | Kovach et al. | A01B 49/027 |
| 2019/0254223 A1 * | 8/2019 | Eichhorn et al. | A01B 63/16 |
| 2020/0344939 A1 * | 11/2020 | Sporrer et al. | A01B 41/06 |

\* cited by examiner

SYSTEM AND METHOD FOR MANAGING MATERIAL ACCUMULATION RELATIVE TO GROUND ENGAGING TOOLS OF AN AGRICULTURAL IMPLEMENT

FIELD OF THE INVENTION

The present disclosure relates generally to plugging or material accumulation and, more particularly, to systems and methods for managing material accumulation relative to ground engaging tools of an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground engaging tools configured to engage the soil as the implement is moved across the field. For example, in certain configurations, the implement may include one or more harrow disks, leveling disks, rolling baskets, shanks, tines, and/or the like. Such ground engaging tool(s) loosen and/or otherwise agitate the soil to prepare the field for subsequent planting operations.

During tillage operations, field materials, such as residue, soil, rocks, and/or the like, may become trapped or otherwise accumulate on or between ground engaging tools. Such accumulations of field materials may inhibit the operation of the ground engaging tools in a manner that prevents the tools from providing adequate tillage to the field. In such instances, it is necessary for the operator to take certain corrective actions to remove the material accumulation. However, it may be difficult for the tillage implement operator to determine when material accumulation occurs relative to the ground engaging tools.

Accordingly, a system and related method for managing material accumulation relative to ground engaging tools of an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for managing material accumulation relative to ground engaging tools of an agricultural implement. The system includes a ground engaging tool and an acoustic sensor configured to generate data indicative of an acoustic parameter of a sound produced as the ground engaging tool engages the ground when a ground engaging operation is performed within a field. Additionally, the system includes a controller communicatively coupled to the acoustic sensor, where the controller is configured to monitor the data received from the acoustic sensor and determine a presence of material accumulation relative to the ground engaging tool based at least in part on the acoustic parameter.

In another aspect, the present subject matter is directed to a method for managing material accumulation relative to ground engaging tools of an agricultural implement. The method includes receiving, with a computing device, data indicative of an acoustic parameter of a sound produced as a ground engaging tool of the agricultural implement engages the ground when a ground engaging operation is performed within a field. The method further includes determining, with the computing device, a presence of material accumulation relative to the ground engaging tool based at least in part on the acoustic parameter. Additionally, the method includes initiating, with the computing device, a control action associated with managing an amount of material accumulation relative to the ground engaging tool.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
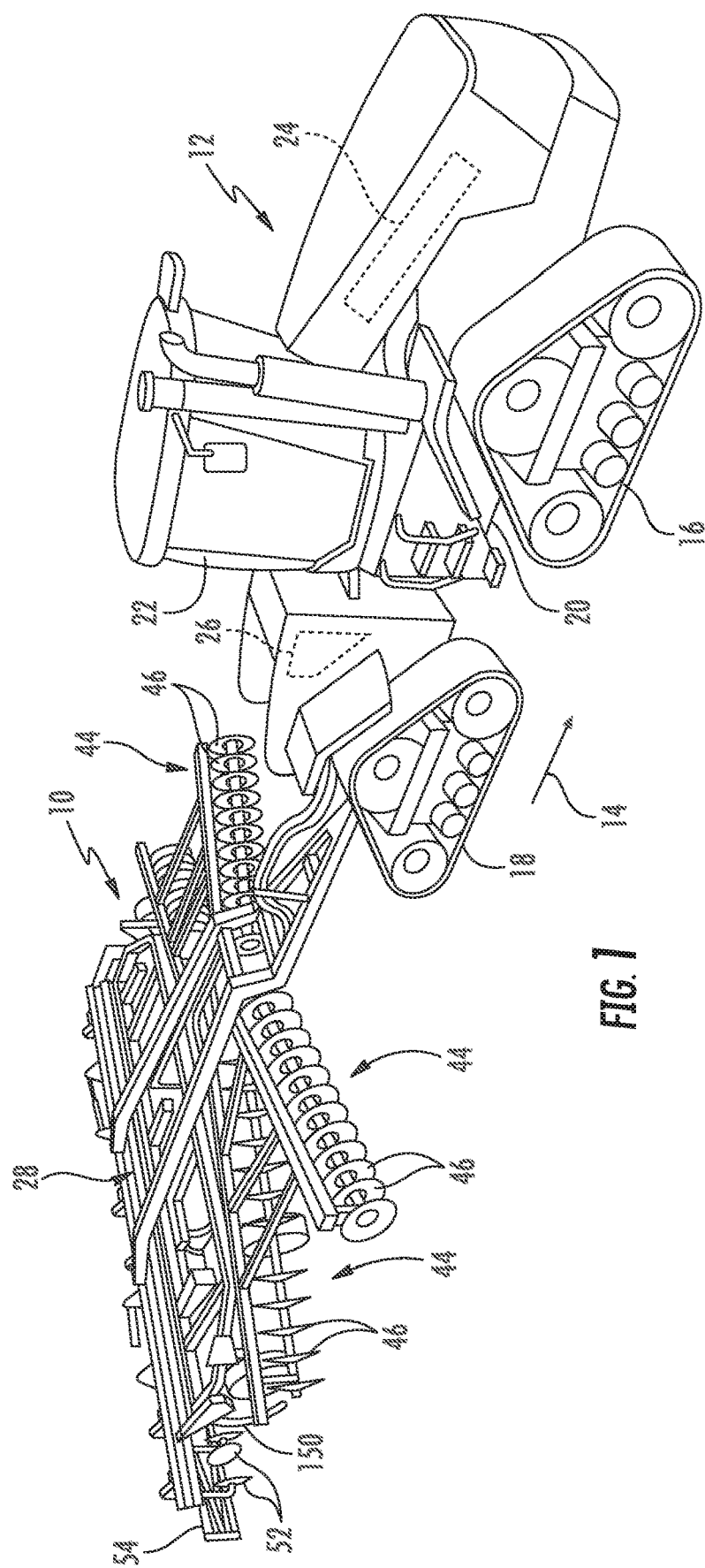
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for managing material accumulation relative to ground engaging tools of an agricultural implement. Specifically, in several embodiments, a controller of the disclosed system may be configured to receive data from one or more acoustic sensors as the implement is being moved across a field. Each acoustic sensor may detect a sound produced as one or more of the associated ground engaging tools engages the ground during a ground engaging operation of the tools and generate data indicative of one or more acoustic parameters of such sound. Typically, during normal operating conditions, where no material accumulation is present relative to the ground engaging tool, each ground engaging tool is associated with an expected sound with expected acoustic parameters. However, as field materials accumulate relative to the ground engaging tool, the acoustic parameters of the associated sound, e.g., produced by at least one of the ground engaging tool or the field materials flowing around the ground engaging tool, may change. For instance, the sound generated during a plugged operating condition of the ground engaging tool, where material accumulation is present relative to the ground engaging tool, may have a different amplitude, frequency, pitch, and/or intensity in comparison to the sound created during normal operating conditions.

As such, in accordance with aspects of the present subject matter, the controller may be configured to monitor the acoustic parameter(s) of the sounds produced associated with the ground engaging tools to determine when residue has accumulated relative to one or more of the ground engaging tools. For instance, in one embodiment, the controller may determine that material accumulation is present relative to one of the ground engaging tools when the detected acoustic parameter associated with such tool differs from the expected or baseline acoustic parameter threshold. In some embodiments, the controller may determine that material accumulation is present relative to one of the ground engaging tools when the detected acoustic parameter associated with the ground engaging tool differs from the detected acoustic parameter associated with another ground engaging tool of the implement. Similarly, in other embodiments, the controller may determine that material accumulation is present relative to one of the ground engaging tools when the detected acoustic parameter associated with an adjacent or neighboring tool differs from the baseline acoustic parameter threshold. Once it is determined that the ground engaging tools have become plugged, the controller may perform one or more control actions. For example, the controller may be configured to indicate the plugged condition of the monitored ground engaging tools (e.g., via a user interface) to the operator and/or adjust the operation of the implement, such as by increasing or decreasing the downforce on the ground engaging tools and/or slowing down or stopping the implement.

Figure 2:
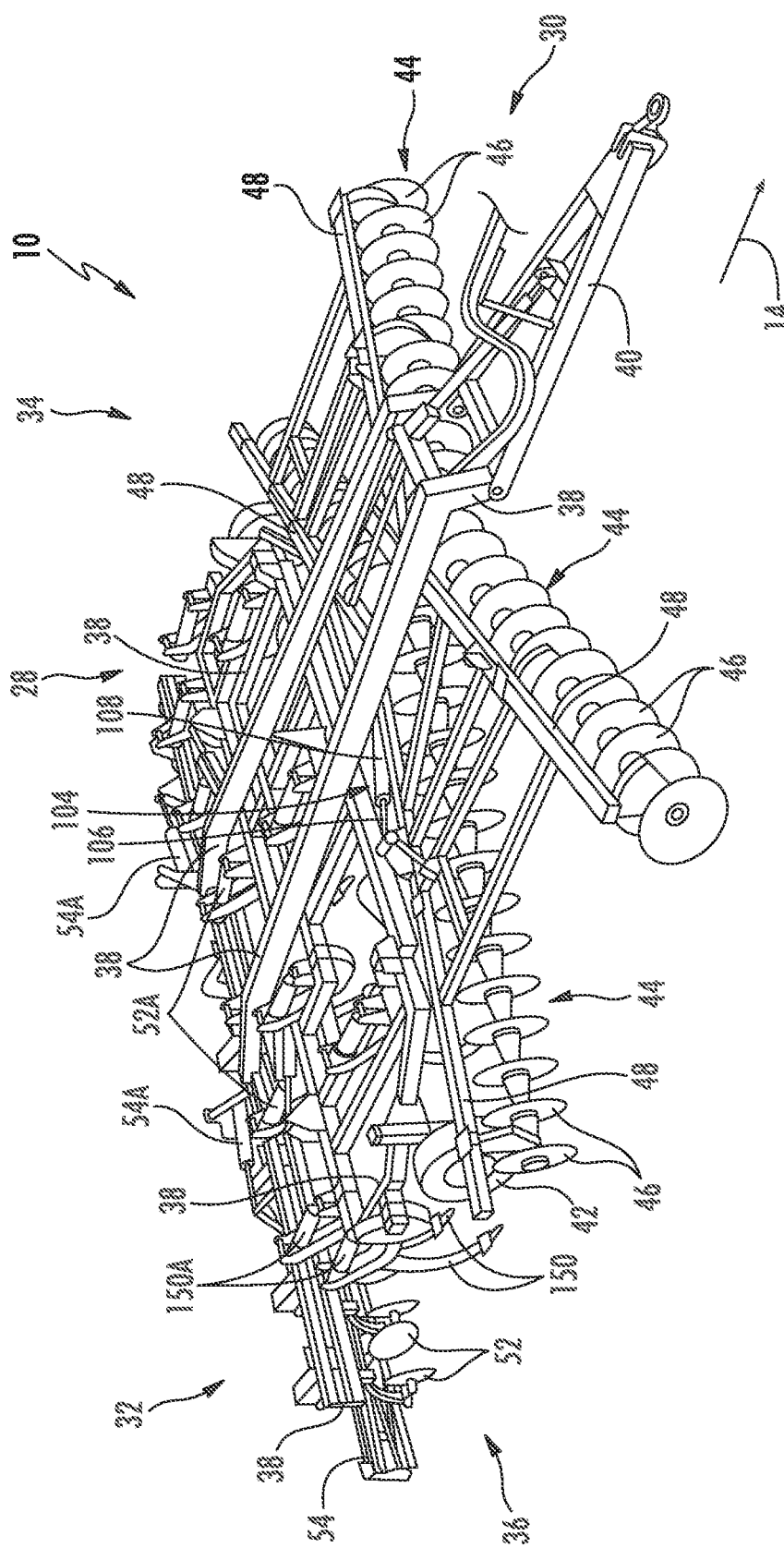
FIG. 2 illustrates another perspective view of the agricultural implement shown in FIG. 1 in accordance with aspects of the present subject matter, particularly illustrating various ground engaging tools and/or assemblies of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16 (only one of which is shown), a pair of rear track assemblies 18 (only one of which is shown), and a frame or chassis 20 coupled to and supported by the track assemblies 16, 18. An operator's cab 22 may be supported by a portion of the chassis 20 and may house various input devices (e.g., a user interface 260 shown in FIG. 5) for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support one or more gangs or sets 44 of disk blades 46. Each disk blade 46 may, in turn, be configured to penetrate into or otherwise engage the soil as the implement 10 is being pulled through the field. In this regard, the various disk gangs 44 may be oriented at an angle relative to the direction of travel 14 to promote more effective tilling of the soil. In the embodiment shown in FIGS. 1 and 2, the implement 10 includes four disk gangs 44 supported on the frame 28 adjacent to its forward end 30. However, it should be appreciated that, in alternative embodiments, the implement 10 may include any other suitable number of disk gangs 44, such as more or fewer than four disk gangs 44. Furthermore, in one embodiment, the disk gangs 44 may be mounted to the frame 28 at any other suitable location, such as adjacent to its aft end 32.

Moreover, in several embodiments, the implement 10 may include a plurality of disk gang actuators 104 (FIG. 2), with each actuator 104 being configured to move or otherwise adjust the orientation or position of one of the disk gangs 44 relative to the implement frame 28. For example, as shown in the illustrated embodiment, a first end of each actuator 104 (e.g., a rod 106 of the actuator 104) may be coupled to a support arm 48 of the corresponding disk gang 44, while a second end of each actuator 104 (e.g., the cylinder 108 of the actuator 104) may be coupled to the frame 28. The rod 106 of each actuator 104 may be configured to extend and/or retract relative to the corresponding cylinder 108 to adjust the angle of the corresponding disk gang 44 relative to a lateral centerline (not shown) of the frame 28 and/or the penetration depth of the associated disk blades 46. In the illustrated embodiment, each actuator 104 corresponds to a fluid-driven actuator, such as a hydraulic or pneumatic cylinder. However, it should be appreciated that each actuator 104 may correspond to any other suitable type of actuator, such as an electric linear actuator.

Additionally, as shown, in one embodiment, the implement frame 28 may be configured to support other ground engaging tools. For instance, in the illustrated embodiment, the frame 28 is configured to support a plurality of shanks 150 or a plurality of tines (not shown) configured to rip or otherwise till the soil as the implement 10 is towed across the field. Furthermore, in the illustrated embodiment, the frame 28 is also configured to support a plurality of leveling blades or disks 52 and rolling (or crumbler) basket assemblies 54. The implement 10 may further include shank frame actuator(s) 150A, leveling disk actuator(s) 52A, and/or basket assembly actuator(s) 54A configured to move or otherwise adjust the orientation or position of the shanks 150, leveling disks 52, and the basket assemblies 54, respectively, relative to the implement frame 28. It should be appreciated that, in other embodiments, any other suitable ground-engaging tools may be coupled to and supported by the implement frame 28, such as a plurality closing disks.

It should also be appreciated that the configuration of the implement 10 and work vehicle 12 described above are provided only to place the present subject matter in an exemplary field of use. Thus, it should be appreciated that the present subject matter may be readily adaptable to any manner of implement or work vehicle configurations.

Figure 3:
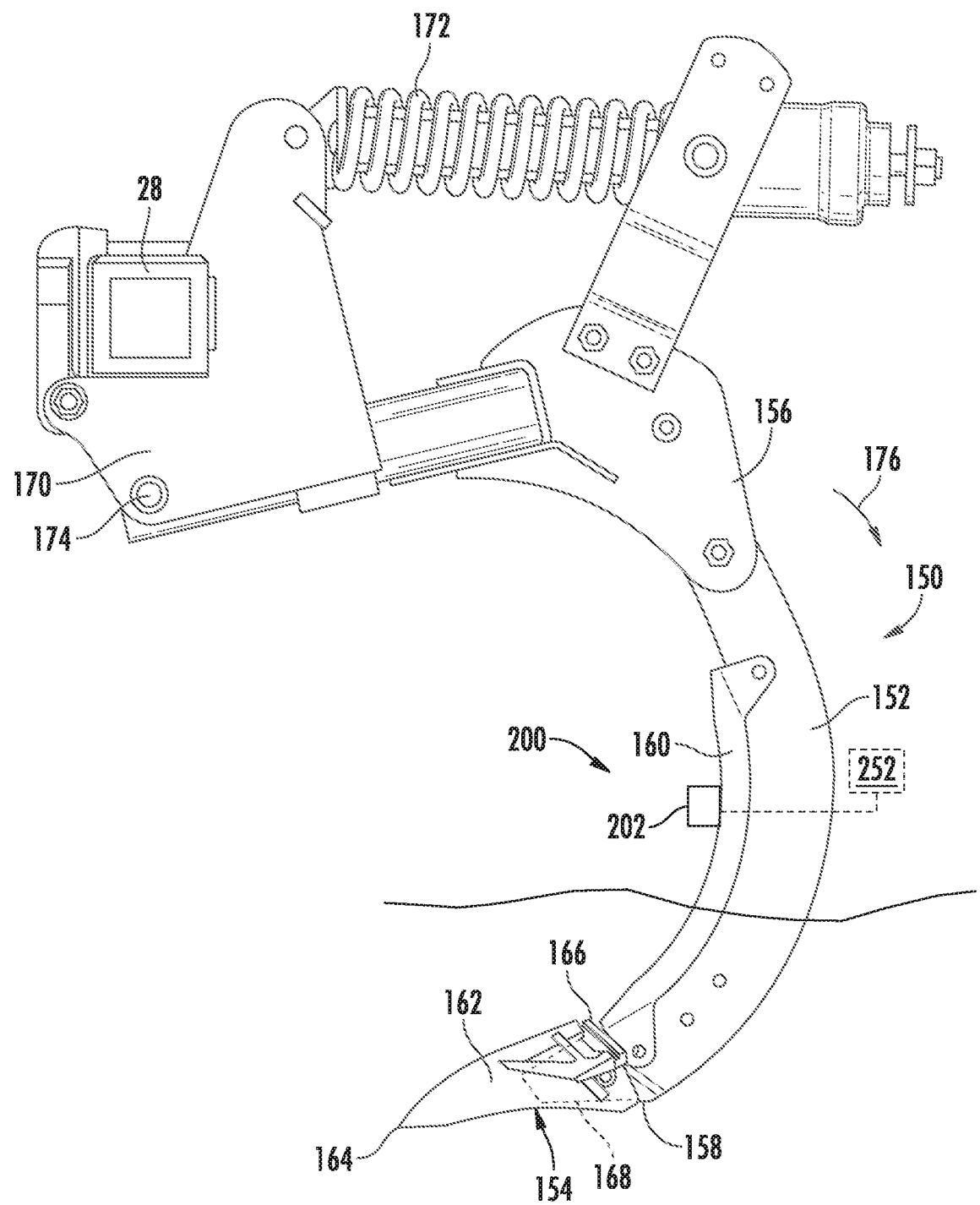
FIG. 3 illustrates a side view of a shank assembly of the agricultural implement shown in FIGS. 1 and 2 in accordance with aspects of the present subject matter, particularly illustrating a normal or non-plugged operating condition of the shank assembly.

Referring now to FIG. 3, a side view of an example embodiment of a shank assembly 150 suitable for use with an agricultural implement (e.g., the implement 10 shown in FIGS. 1 and 2) is illustrated in accordance with aspects of the present subject matter. It should be appreciated that, for purposes of discussion, the shank assembly 150 will be described with reference to the tillage implement 10 shown in FIG. 1. However, those of ordinary skill in the art will readily appreciate that the disclosed shank assemblies 150 may be utilized with any suitable agricultural implements having any other suitable implement configuration(s).

In general, as shown in FIG. 3, the shank assembly 150 may include a shank 152 configured to be pivotally coupled to the implement frame 28 and a tillage point 154 configured to be coupled to the shank 152. For instance, the shank 152 may extend lengthwise between a proximal end 156 and a distal end 158, with the proximal end 156 being configured to be coupled to the implement frame 28, e.g., via a mount 170 rigidly coupled to the implement frame 28, and the distal end 158 being configured to be coupled to the tillage point 154. For example, the tillage point 154 may generally include a body 162 extending lengthwise between a tip end 164 and an opposed retention end 166, where the retention end 166 of the body 162 may generally be configured to allow the distal end 158 of the shank 152 to be coupled to the tillage point 152. For instance, in one embodiment, the retention end 166 of the body 162 may include a retention slot 168 defined therein for receiving the distal end 158 of the shank 152. Additionally, in some embodiments, the shank assembly 150 may include a shin 160 configured to be coupled to the shank 152 above the tillage point 154 to protect the shank 152 from wear.

As shown in FIG. 3, the shank assembly 150 may also include a biasing member 172 (e.g., a spring) coupled between the shank 152 and the mount 170 to bias the shank 152 towards its ground-engaging position relative to the frame (e.g., the position shown in FIG. 3). For instance, the biasing member 172 may bias the shank 152 downwardly such that the shank pivots about a pivot point 174 defined between the shank 152 and the mount 170 back towards its ground-engaging position (e.g., in pivot direction indicated by arrow 176) following temporary pivotal movement of the shank 152 in the opposite direction as the shank 152 encounters rocks or other impediments in the field during operation of the implement 10.

In accordance with aspects of the present subject matter, a sensing assembly 200 may be associated with the shank assembly 150 for detecting sounds generated as the shank assembly 150 engages ground during a ground engaging operation, which may be indicative of changes in the amount of residue accumulation on the shank assembly 150. In several embodiments, the sensing assembly 200 may include an acoustic sensor 202 positioned relative to the shank assembly 150 such that the acoustic sensor 202 is configured to provide acoustic data indicative of a plugged operating condition of the associated shank assembly 150. For example, as shown in FIG. 3, the sensing assembly 200 includes an acoustic sensor 202 positioned on the shank 152 and/or shin 160 such that the acoustic sensor 202 remains above the field surface when the shank assembly 150 is in a ground engaging position. However, it should be appreciated that the acoustic sensor 202 may additionally or otherwise be supported on and/or coupled to any other suitable component of or location on the shank assembly 150 and/or frame member of the implement 10 that allows it to function as described herein.

Generally, the acoustic sensor 202 may be configured to capture acoustic data associated with the sounds generated as the associated shank assembly 150 engages the ground during a ground engaging operation of the shank assembly 150. Particularly, the sounds generated as the shank assembly 150 engages the ground may comprise at least one of a sound produced by the shank assembly 150 or a sound produced by field materials flowing around the shank assembly 150. For instance, in one embodiment, the acoustic sensor 202 is configured as any suitable microphone, such as a capacitor microphone, electret microphone, moving-coil microphone, piezoelectric microphone, and/or the like. However, in alternative embodiments, the acoustic sensor 202 may correspond to an acoustic accelerometer or any other suitable type of acoustic sensor. Moreover, the acoustic data may include data corresponding to different acoustic parameters of the sound. For instance, in one embodiment, the acoustic parameters may include an amplitude, frequency, pitch, and/or intensity of the sounds or noises detected by the acoustic sensor 202. However, it should be appreciated that, in alternative embodiments, the determined acoustic parameters may correspond to any other suitable parameters.

During a normal, non-plugged operating condition of the shank assembly 150, the shank 152 is generally free of accumulated residue, soil, and/or other field debris such that known or expected sounds are present or generated by the shank assembly 150 and the field materials flowing around the shank assembly 150 as the shank assembly 150 works the field. For instance, the shank assembly 150 and the field materials flowing around the shank assembly 150 may generate baseline or expected sounds, where each baseline sound has one or more baseline or expected acoustic parameters, such as at least one of a baseline amplitude, a baseline frequency, a baseline pitch, or a baseline intensity during a normal operating condition. However, as will be described below in greater detail, when the sound associated with the shank assembly 150 deviates from its baseline sound, or from sounds associated with one or more other shank assemblies 150 of the implement, a plugged operating condition of the shank assembly 150 may be inferred or estimated.

Figure 4:
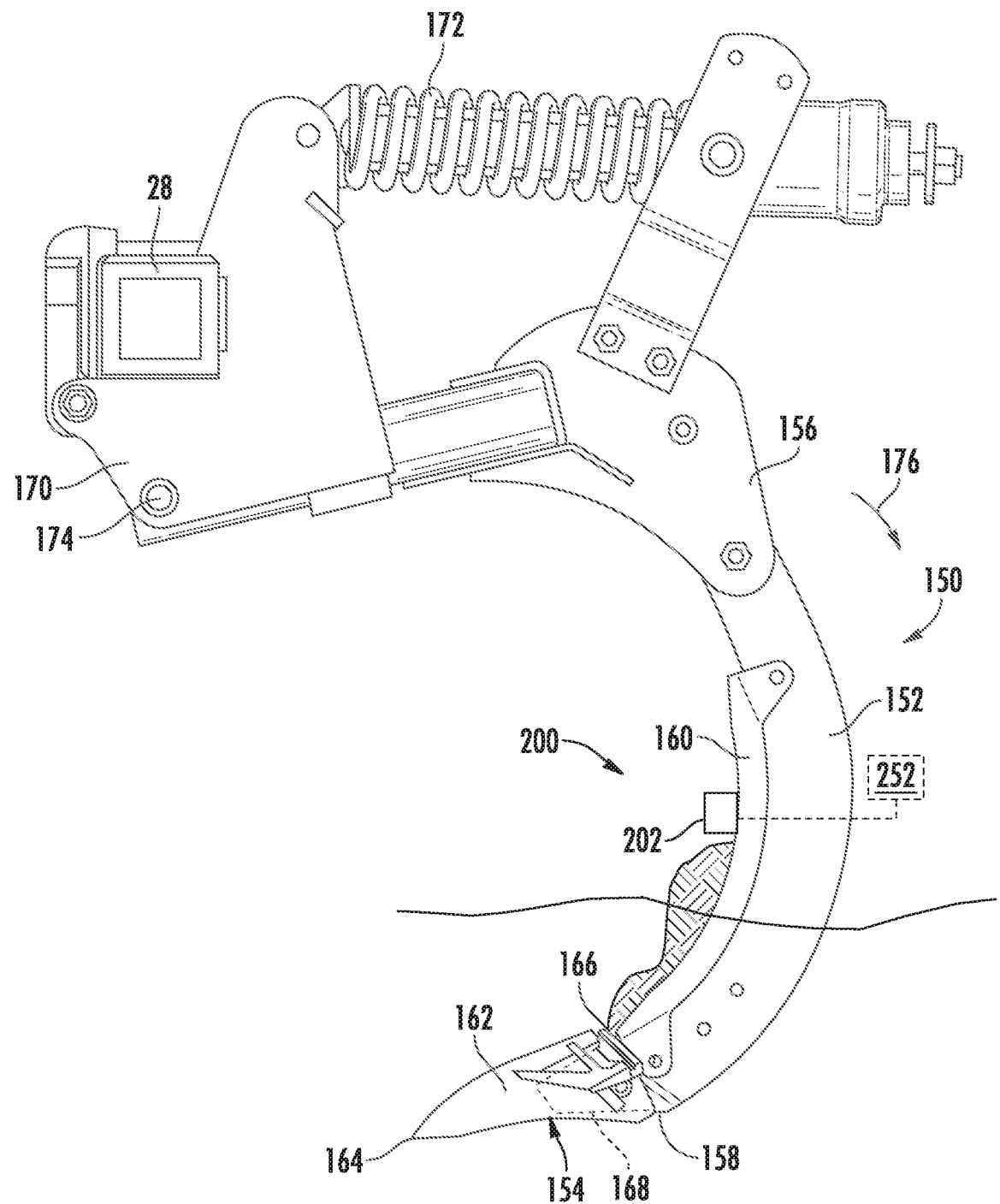
FIG. 4 illustrates another side view of the shank assembly shown in FIG. 3 in accordance with aspects of the present subject matter, particularly illustrating a plugged operating condition of the shank assembly.

For instance, referring now to FIG. 4, another side view of the shank assembly 150 shown in FIG. 3 is illustrated in accordance with aspects of the present subject matter, particularly illustrating a plugged operating condition of the shank assembly 150. As shown in FIG. 4, during a plugged operating condition of the shank assembly 150, field materials, such as residue, soil, and/or other field debris, accumulate on the shank 152 of the shank assembly 150. During such a plugged operating condition, the acoustic parameters of the sounds generated as the shank assembly 150 engages the ground, e.g., the sounds generated by the shank assembly 150 and the field materials flowing around the shank assembly 150, will vary from the baseline acoustic parameters described above. For instance, each of the acoustic parameters of the detected sound may be "muffled" or damped in comparison to the associated baseline acoustic parameter. For example, the detected amplitude may be lower than the baseline amplitude, the detected frequency may be slower than the baseline frequency, the detected pitch may be lower than the baseline pitch, or the detected intensity or volume may be lower than the baseline intensity It should be appreciated that, while the sensing assembly 200 has been described as having one acoustic sensor 202, the sensing assembly 200 may include any suitable number of acoustic sensors 202 such that the acoustic parameters associated with each of the shank assemblies 150 can be monitored. For instance, in one embodiment, the sensing assembly 200 may include two or more acoustic sensors 202, such as one acoustic sensor 202 for each shank assembly 150. Further, it should be appreciated that, while the acoustic sensor 202 has been described as being used to detect the sound generated by an associated shank assembly 150 (e.g., the shank assembly 150 to which it is mounted) and the field materials flowing around the associated shank assembly 150, the acoustic sensor 202 may be configured to alternatively or additionally detect the sounds associated with other shank assemblies 150. For instance, the acoustic sensor 202 associated with one shank assembly 150 may also be configured to detect sounds associated with an adjacent shank assembly 150. Moreover, it should be appreciated that while only one sensing assembly 200 has been described herein with reference to determining plugging or material accumulation relative to shank assemblies 150 of an agricultural implement 10, multiple sensing assemblies 200 may be associated with the agricultural implement. For instance, in one embodiment, any suitable number of sensing assemblies 200 may be associated with the shank assemblies 150 such that the acoustic parameters associated with each of the shank assemblies 150 can be monitored.

It should further be appreciated that, while the sensing assembly 200 has generally been described herein with reference to determining a plugged operating condition of a shank assembly 150 of a tillage implement 10, the sensing assembly 200 may be configured to be associated with any other ground engaging tools or ground engaging assemblies of any suitable agricultural implement.

Figure 5:
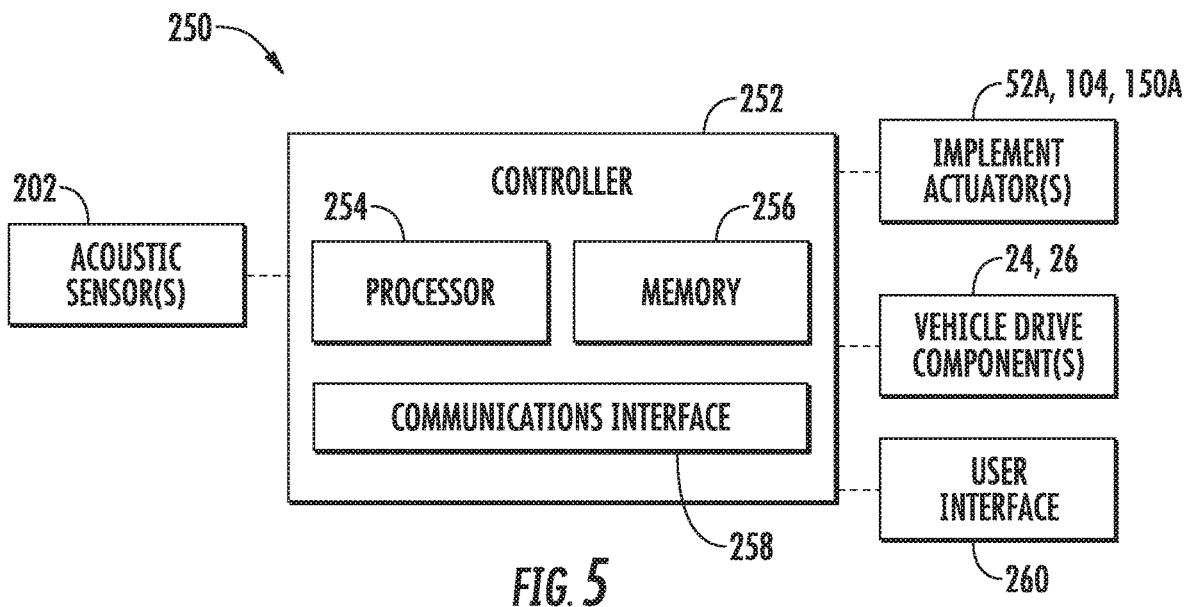
FIG. 5 illustrates a schematic view of one embodiment of a system for managing material accumulation relative to ground engaging tools of an agricultural implement in accordance with aspects of the present subject matter.

Referring now to FIG. 5, a schematic view of one embodiment of a system 250 for managing material accumulation relative to ground engaging tools of an agricultural implement is illustrated in accordance with aspects of the present subject matter. In general, the system 250 will be described herein with reference to the implement 10 described above with reference to FIGS. 1 and 2 and the sensing assembly 200 described above with reference to FIGS. 3 and 4. However, it should be appreciated by those of ordinary skill in the art that the disclosed system 250 may generally be utilized with agricultural implements having any other suitable implement configuration and/or with ground engaging assemblies/tools having any other suitable assembly/tool configuration.

As shown in FIG. 5, the system 250 may include a controller 252 configured to electronically control the operation of one or more components of the agricultural implement 10. In general, the controller 252 may comprise any suitable processor-based device known in the art, such as a computing device or any suitable combination of computing devices. Thus, in several embodiments, the controller 252 may include one or more processor(s) 254, and associated memory device(s) 256 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 256 of the controller 252 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 256 may generally be configured to store suitable computer-readable instructions that, when implemented by the processor(s) 254, configure the controller 252 to perform various computer-implemented functions, such as one or more aspects of the methods and algorithms that will be described herein. In addition, the controller 252 may also include various other suitable components, such as a communications circuit or module, one or more input/output channels, a data/control bus and/or the like.

It should be appreciated that, in several embodiments, the controller 252 may correspond to an existing controller of the agricultural implement 10 and/or of the work vehicle 12 to which the implement 10 is coupled. However, it should be appreciated that, in other embodiments, the controller 252 may instead correspond to a separate processing device. For instance, in one embodiment, the controller 252 may form all or part of a separate plug-in module that may be installed within the agricultural implement 10 to allow for the disclosed system and method to be implemented without requiring additional software to be uploaded onto existing control devices of the agricultural implement 10.

In some embodiments, the controller 252 may be configured to include a communications module or interface 258 to allow for the controller 252 to communicate with any of the various other system components described herein. For instance, the controller 252 may, in several embodiments, be configured to receive data inputs from one or more sensors of the agricultural implement 10 that are used to detect one or more parameters associated with material accumulation relative to the associated ground engaging assembly. Particularly, the controller 252 may be in communication with one or more sensors configured to detect parameters indicative of material accumulation on ground engaging tools of the associated ground engaging assembly. For instance, the controller 252 may be communicatively coupled to one or more acoustic sensor(s) 202 via any suitable connection, such as a wired or wireless connection, to allow data indicative of material accumulation on the ground engaging tools to be transmitted from the sensor(s) 202 to the controller 252.

Specifically, referring back to FIGS. 3 and 4, each sensing assembly 200 may, for example, include or be associated with acoustic sensors 202 installed or otherwise positioned relative to ground engaging tools to capture data (e.g., acoustic data) indicative of a sound generated as the ground engaging tools engage the ground, which in turn, is indicative of material accumulation relative to the ground engaging tools (e.g., disk blades 46, leveling discs 52, shanks 150, etc.) of the implement 10. Thus, in several embodiments, the controller 252 may be configured to determine the presence and/or amount of material accumulation relative to the ground engaging tools based on the data received from the sensor(s) 202. For example, the controller 252 may include one or more suitable algorithms stored within its memory 256 that, when executed by the processor 254, allow the controller 252 to infer or estimate the presence and/or amount of material accumulation relative to the ground engaging tools based on the data received from the sensor(s) 202.

For instance, in some embodiments, the controller 252 may include one or more algorithms that compare the detected sounds generated as the ground engaging tools engage the ground to a baseline sound to determine the presence of material accumulation. For example, in one embodiment, the controller 252 may determine the presence of material accumulation relative to the ground engaging tools when the detected sounds generated as the ground engaging tools engage the ground differ from the baseline sound. More particularly, the controller 252 may determine the presence of material accumulation relative to a ground engaging tool when one or more detected acoustic parameters (e.g., amplitude, frequency, pitch, and/or intensity) of the sounds generated as the ground engaging tool engages the ground differs from the associated baseline acoustic parameter threshold(s) of the baseline sound expected to be generated as the ground engaging tool engages the ground. In one embodiment, the controller 252 may determine the presence of material accumulation relative to a ground engaging tool when the detected acoustic parameter(s) differs from the associated baseline acoustic parameter threshold(s). For instance, as indicated above, the detected acoustic parameters may generally be lower than the associated baseline acoustic parameter thresholds when material accumulation is present. As such, in one embodiment, the controller 252 may determine the presence of material accumulation relative to a ground engaging tool when the detected acoustic parameter(s) falls below the associated baseline acoustic parameter threshold(s).

In some embodiments, the controller 252 may be configured to determine the presence of material accumulation when the detected sound differs from the baseline sound by a predetermined amount. For instance, the controller 252 may include one or more algorithms that compares a differential between the detected acoustic parameter(s) of the detected sounds generated as the ground engaging tools engage the ground and the associated baseline acoustic parameter threshold(s) (referred to hereafter as the "detected differential") to one or more predetermined differential thresholds associated with different severities of the presence of material accumulation relative to the ground engaging tool. It should be appreciated that, in some embodiments, the differential threshold(s) may be selected based on experimental results for different levels of plugging of the ground engaging tool. However, the differential threshold(s) may be selected in any other suitable manner.

In one embodiment, the differential threshold(s) may include a minimum differential threshold, which corresponds to the detected differential when the ground engaging tool first begins to move through the soil within the field. As such, when the detected differential is less than or equal to the minimum differential threshold, the ground engaging tool may be in a normal operating condition. Additionally, in some embodiments, the differential threshold(s) may include a maximum differential threshold, which corresponds to the detected differential when excessive material accumulation has built up relative to the ground engaging tool. In such embodiment, when the detected differential is greater than or equal to the maximum differential threshold, the ground engaging tool may be experiencing a severe or fully plugged operating condition of the ground engaging tool. Further, the differential thresholds may have a proportional relationship. For instance, when the detected differential is greater than or equal to the minimum differential threshold and less than the maximum differential threshold, but closer to the minimum differential threshold, the ground engaging tool may be experiencing a less severe or partially plugged operating condition. Similarly, when the detected differential is greater than or equal to the minimum differential threshold and less than the maximum differential threshold, but closer to the maximum differential threshold, the ground engaging tool may be experiencing a more severe or more plugged operating condition.

In one embodiment, the controller 252 may infer the presence of material accumulation relative to one or more of the ground engaging tools that are directly adjacent to a ground engaging tool. For instance, the controller 252 may determine that the ground engaging tools on either side of a fully plugged ground engaging tool, e.g., adjacent disks of a disk gang, are also likely experiencing plugging. As such, in some embodiments, the controller 252 may be configured to determine the presence of material accumulation relative to one or more of the ground engaging tools that are directly adjacent to a ground engaging tool that is determined to be experiencing a fully plugged operating condition.

In some embodiments, the controller 252 may include one or more algorithms that compare the detected sounds generated as the ground engaging tools engage the ground to sounds generated as other ground engaging tools with the same baseline sound engage the ground. For instance, in one embodiment, the controller 252 may determine the presence of material accumulation relative to one of the ground engaging tools when the detected sounds associated with the ground engaging tool differs from the sounds associated with the other ground engaging tools. For example, if a group of ground engaging tools are associated with the same baseline sound during a normal operating condition are all associated with the same or substantially similar detected sound during a ground engaging operation except one ground engaging tool of the group, then the one ground engaging tool associated with the different detected sound is most likely plugged.

Particularly, in one embodiment, the controller 252 may be configured to compare the acoustic parameters associated with the group of ground engaging tools and determine the presence of material accumulation relative to at least one ground engaging tool of the group of ground engaging tools when the acoustic parameter(s) associated with the at least one ground engaging tool differs from the acoustic parameter(s) associated with the others of the group of ground engaging tools by a given amount. For instance, a differential between the acoustic parameter(s) associated with each ground engaging tool of the group of ground engaging tools and average acoustic parameter(s) associated with the group of ground engaging tools may be compared to one or more differential thresholds, similar to that described above. However, in other embodiments, the presence of material accumulation relative to at least one ground engaging tool of the group of ground engaging tools may be determined in any other suitable way.

In some embodiments, the group of ground engaging tools form part of a ground engaging assembly (e.g., a disk assembly) on one lateral side of the implement 10. However, in other embodiments, the group of ground engaging tools may extend across the entire lateral width of the implement 10. In one embodiment, each of the ground engaging tools of the group of ground engaging tools is associated with its own acoustic sensor 202. However, in other embodiments, two or more ground engaging tools of the group of ground engaging tools may be associated with the same acoustic sensor 202.

The controller 252 may further confirm or determine the existence of a plugged condition by monitoring a frequency or a period at which the material accumulation is detected. For instance, the controller 252 may compare the frequency or the period at which the excessive material accumulation is detected to a frequency threshold or a period threshold corresponding to a persistence of the material accumulation relative to the ground engaging tools, and/or the like. The controller 252 may determine that a plugged operating condition exists when the plugged condition is detected (by one or more of the methods described above) more frequently than the frequency threshold and/or for periods longer than the period threshold. The controller 252 may further use a combination of such thresholds to further verify the likelihood of plugging.

The controller may further be configured to perform one or more implement-related control actions based on the data received from the sensor(s) 202, 214. Specifically, the controller 252 may be configured to control one or more components of the agricultural implement 10 on the determination of the presence of excessive material accumulation or a plugging condition relative to the ground engaging tools. For example, when the ground engaging tools correspond to shank assemblies 150, the controller 252 may be configured to control the shank frame actuator(s) 150A associated with the respective shank assembly(ies) 150 experiencing material accumulation. For instance, the controller 252 may be configured to control the shank frame actuator(s) 150 to adjust a penetration depth of the shank assembly(ies) 150 experiencing material accumulation, which may help reduce the amount of material accumulation formed relative thereto. Similarly, when the ground engaging tools correspond to disk blades of a disk gang, such as the disk blades 46 of the disk gang 44, the controller 252 may be configured to control the disk gang actuator(s) 104 to adjust the penetration depth of the disk blades 46 and reduce the amount of material accumulation formed relative thereto. Additionally, the controller 252 may be configured to control the leveling disk actuator(s) 52A. For instance, the controller 252 may be configured to control the leveling disk actuator(s) 52A to adjust a penetration depth of the leveling disks 52 to help reduce the amount of material accumulation formed relative to the leveling disks 52.

Further, in some embodiments, the controller 252 may be configured to indicate to an operator the presence of material accumulation and/or one or more parameters associated with the material accumulation determined relative to the ground engaging tools. For example, in the embodiment shown in FIG. 5, the communications module 258 may allow the controller 252 to communicate with a user interface having a display device configured to display information regarding the presence of material accumulation (e.g., amount, frequency, duration, patterns, and/or the like) determined relative to the ground engaging tools. It should be appreciated that the user interface may be positioned within the cab (e.g., the user interface 260) or may be positioned remotely from the work vehicle 12 and/or implement 10. It should further be appreciated that the controller 252 may instead or additionally be communicatively coupled to any number of other indicators, such as lights, audio devices (e.g., alarms, speakers, etc.), and/or the like to provide an indicator to the operator regarding the presence of material accumulation relative to the ground engaging tools.

Additionally or alternatively, in some embodiments, the controller 252 may be configured to perform one or more vehicle-related control actions based on the determination of a plugging condition relative to the ground engaging tools. For example, as shown in FIG. 5, in some embodiments, the controller 252 may be configured to control the operation of one or more vehicle drive components configured to drive the vehicle 12 coupled to the implement 10, such as the engine 24 and/or the transmission 26 of the vehicle 12. In such embodiments, the controller 252 may be configured to control the operation of the vehicle drive component(s) 24, 26 based on the determination of the material accumulation, for example, to slow down the vehicle 12 and implement 10 or bring the vehicle 12 and implement 10 to a stop when it is determined that the material accumulation is excessive.

It should be appreciated that, depending on the type of controller 252 being used, the above-described control actions may be executed directly by the controller 252 or indirectly via communications with a separate controller. For instance, when the controller 252 corresponds to an implement controller of the implement 10, the controller 252 may be configured to execute the implement-related control actions directly while being configured to execute the vehicle-related control actions by transmitting suitable instructions or requests to a vehicle-based controller of the vehicle 12 towing the implement 10 (e.g., using an ISObus communications protocol). Similarly, when the controller 252 corresponds to a vehicle controller of the vehicle towing the implement 10, the controller 252 may be configured to execute the vehicle-related control actions directly while being configured to execute the implement-related control actions by transmitting suitable instructions or requests to an implement-based controller of the implement 10 (e.g., using an ISObus communications protocol). In other embodiments, the controller 252 may be configured to execute both the implement-based control actions and the vehicle-based control actions directly or the controller 252 may be configured to execute both of such control action types indirectly via communications with a separate controller.

Figure 6:
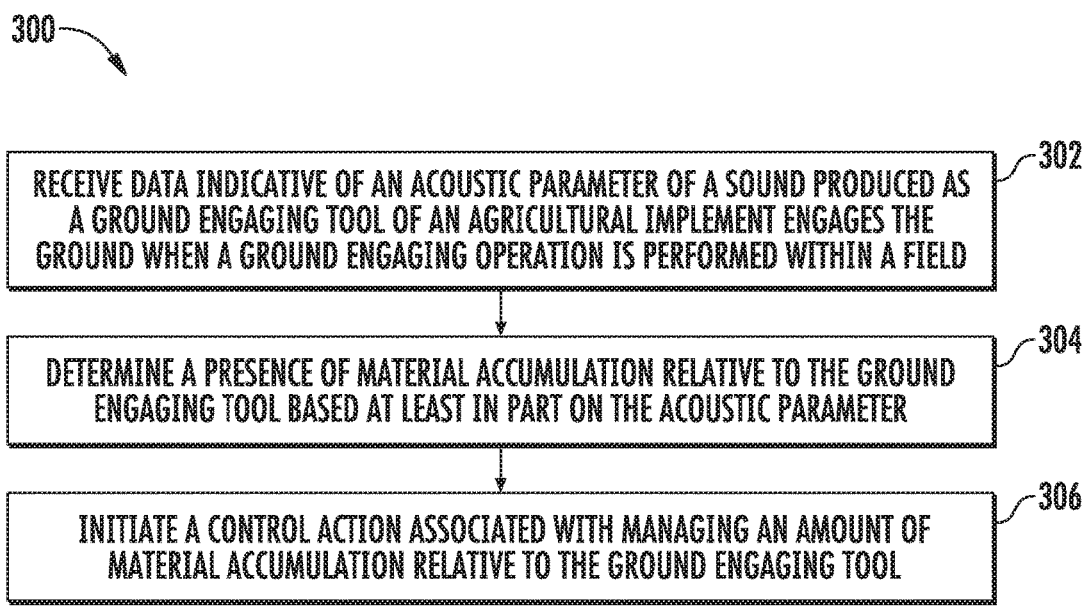
FIG. 6 illustrates a flow diagram of one embodiment of a method for managing material accumulation relative to ground engaging tools of an agricultural implement in accordance with aspects of the present subject matter.

Referring now to FIG. 6, a flow diagram of one embodiment of a method 300 for managing material accumulation relative to ground engaging tools of an agricultural implement is illustrated in accordance with aspects of the present subject matter. In general, the method 300 will be described herein with reference to the implement 10 and the work vehicle 12 shown in FIGS. 1 and 2, the sensing assembly 200 shown in FIGS. 3-4, as well as the various system components shown in FIG. 5. However, it should be appreciated that the disclosed method 300 may be implemented with work vehicles and/or implements having any other suitable configurations and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 6, at (302), the method 300 may include receiving data indicative of an acoustic parameter of a sound produced as a ground engaging tool of the agricultural implement engages the ground when a ground engaging operation is performed within a field. For instance, as indicated above, the controller 252 may receive acoustic data from an acoustic sensor 202 corresponding to a sound generated by a ground engaging tool (e.g., shank assembly 100 of the implement 10) performing a ground engaging operation.

Further, as shown at (304), the method 300 may include determining a presence of material accumulation relative to the ground engaging tool based at least in part on the acoustic parameter. For example, as indicated above, the controller 252 may, in one embodiment, determine the presence of material accumulation relative to a ground engaging tool when the sound associated with the ground engaging tool (e.g., the sound generated by the ground engaging tool and the field material flowing past the ground engaging tool) differs from a baseline sound associated with the ground engaging tool. In another embodiment, the controller 252 may determine the presence of material accumulation relative to a ground engaging tool when the sound associated with the ground engaging tool differs from the sounds associated with one or more ground engaging tools having the same baseline sound. Similarly, in another embodiments, the controller 252 may determine the presence of material accumulation relative to a ground engaging tool when the sound associated with an adjacent ground engaging tool differs from the baseline sound.

Additionally, as shown at (308), the method 300 may include initiating a control action associated with managing an amount of material accumulation relative to the ground engaging tool. For instance, as indicated above, the controller 252 may be configured to control the operation of an actuator 52A, 104, 150A of the implement 10 to adjust the penetration depth of the respective ground engaging tool(s) (e.g., leveling disks 52, disk blades 44, shanks 150) and/or to control the operation of the vehicle drive component(s) 24, 26 of the vehicle 12 towing the implement 10 to slow down or stop the implement 10. In some embodiments, the controller 252 may indicate to an operator of material accumulation relative to one or more of the ground engaging tools, e.g., by controlling the operation of the user interface 260 to display information relating to the operating condition of the ground engaging tools.

It is to be understood that the steps of the method 300 are performed by the controller 252 upon loading and executing software code or instructions which are tangibly stored on a tangible computer readable medium, such as on a magnetic medium, e.g., a computer hard drive, an optical medium, e.g., an optical disk, solid-state memory. e.g., flash memory, or other storage media known in the art. Thus, any of the functionality performed by the controller 252 described herein, such as the method 300, is implemented in software code or instructions which are tangibly stored on a tangible computer readable medium. The controller 252 loads the software code or instructions via a direct interface with the computer readable medium or via a wired and/or wireless network. Upon loading and executing such software code or instructions by the controller 252, the controller 252 may perform any of the functionality of the controller 252 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for managing material accumulation relative to ground engaging tools of an agricultural implement, the system comprising:
    a ground engaging tool;
    an acoustic sensor configured to generate data indicative of an acoustic parameter of a sound produced as a result of the ground engaging tool engaging the ground when a ground engaging operation is performed within a field; and
    a controller communicatively coupled to the acoustic sensor, the controller being configured to monitor the data received from the acoustic sensor and determine a presence of material accumulation relative to the ground engaging tool based at least in part on the acoustic parameter.

2. The system of claim 1, wherein the controller is configured to compare the acoustic parameter to a baseline acoustic parameter threshold and determine the presence of material accumulation relative to the ground engaging tool when the acoustic parameter differs from the baseline acoustic parameter threshold.

3. The system of claim 2, wherein the controller is configured to determine the presence of material accumulation relative to the ground engaging tool when the acoustic parameter differs from the baseline acoustic parameter threshold by a predetermined amount.

4. The system of claim 1, wherein the ground engaging tool comprises a first ground engaging tool, the system further comprising a second ground engaging tool, the controller being configured to receive data indicative of a second acoustic parameter of a sound produced as a result of the second ground engaging tool engaging the ground when the ground engaging operation is performed and determine the presence of material accumulation relative to the first ground engaging tool when the acoustic parameter differs from the second acoustic parameter by a predetermined amount.

5. The system of claim 4, further comprising a second acoustic sensor configured to generate data indicative of the second acoustic parameter of the sound produced as the result of the second ground engaging tool engaging the ground.

6. The system of claim 4, wherein the data indicative of the second acoustic parameter is generated by the acoustic sensor.

7. The system of claim 1, wherein the ground engaging tool comprises a first ground engaging tool, the system further comprising a second ground engaging tool, the first and second ground engaging tools forming part of a tool set of the agricultural implement and being positioned adjacent to each other,
wherein the controller is configured to determine a presence of material accumulation relative to the second ground engaging tool based at least in part on the acoustic parameter of the sound produced as the result of the first ground engaging tool engaging the ground.

8. The system of claim 1, wherein the controller is further configured to initiate a control action when the presence of material accumulation is determined.

9. The system of claim 8, wherein the control action comprises adjusting at least one of a ground speed of the agricultural implement or a penetration depth of the ground engaging tool.

10. The system of claim 1, wherein the acoustic parameter comprises at least one of an amplitude, a frequency, a pitch, or an intensity of the sound produced as the result of the ground engaging tool engaging the ground.

11. The system of claim 1, wherein the sound produced as the result of the ground engaging tool engaging the ground comprises at least one of a sound produced by the ground engaging tool or a sound produced by field materials flowing around the ground engaging tool.

12. A method for managing material accumulation relative to ground engaging tools of an agricultural implement, the method comprising:
receiving, with a computing device, data indicative of an acoustic parameter of a sound produced as a result of a ground engaging tool of the agricultural implement engaging the ground when a ground engaging operation is performed within a field;
determining, with the computing device, a presence of material accumulation relative to the ground engaging tool based at least in part on the acoustic parameter; and
initiating, with the computing device, a control action associated with managing an amount of material accumulation relative to the ground engaging tool.

13. The method of claim 12, further comprising comparing the acoustic parameter to a baseline acoustic parameter threshold.

14. The method of claim 13, wherein determining the presence of material accumulation relative to the ground engaging tool comprises determining the presence of material accumulation relative to the ground engaging tool when the acoustic parameter differs from the baseline acoustic parameter threshold by a predetermined amount.

15. The method of claim 12, wherein the ground engaging tool comprises a first ground engaging tool, the method further comprising:
receiving, with the computing device, data indicative of a second acoustic parameter of a sound produced as result of a second ground engaging tool of the agricultural implement engaging the ground when the ground engaging operation is performed,
wherein determining the presence of material accumulation relative to the first ground engaging tool comprises determining the presence of material accumulation relative to the first ground engaging tool when the acoustic parameter differs from the second acoustic parameter by a predetermined amount.

16. The method of claim 15, wherein the data indicative of the acoustic parameter is received from a first acoustic sensor and the data indicative of the second acoustic parameter is received from a second acoustic sensor.

17. The method of claim 12, wherein the ground engaging tool comprises a first ground engaging tool, the method further comprising determining, with the computing device, the presence of material accumulation relative to a second ground engaging tool based at least in part on the acoustic parameter of the sound produced as the result of the first ground engaging tool engaging the ground, the first and second ground engaging tools forming part of a tool set of the agricultural implement and being positioned directly adjacent to the second ground engaging tool.

18. The method of claim 12, wherein the control action comprises adjusting at least one of a ground speed of the agricultural implement or a penetration depth of the ground engaging tool.

19. The method of claim 12, wherein the acoustic parameter comprises at least one of an amplitude, a frequency, a pitch, or an intensity of the sound produced as the result of the ground engaging tool engaging the ground.

20. The method of claim 12, wherein the sound produced as the result of the ground engaging tool engaging the ground comprises at least one of a sound produced by the ground engaging tool or a sound produced by field materials flowing around the ground engaging tool.

* * * * *